Dec. 18, 1962     J. W. SNOWMAN ET AL     3,068,879
OXYGEN SUPPLY SYSTEM
Filed May 31, 1961
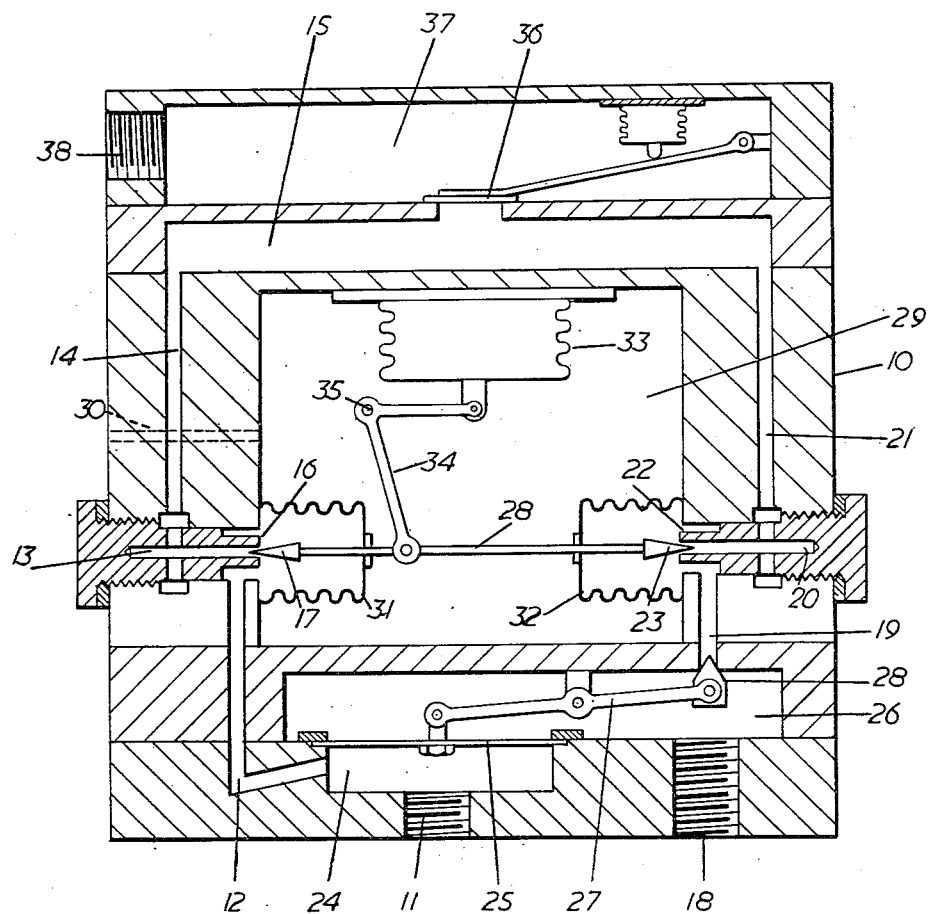
Inventors
JOHN W. SNOWMAN
ALEC T. BELL
By Aaron R. Townsend
Attorney United States Patent Office 3,068,879
Patented Dec. 18, 1962

3,068,879
OXYGEN SUPPLY SYSTEM
John Washington Snowman and Alec Thomas Bell, both of Harlow, Essex, England, assignors to The British Oxygen Company Limited, a British company
Filed May 31, 1961, Ser. No. 113,829
5 Claims. (Cl. 137—81)

This invention relates to an oxygen supply system, particularly for aircraft use, and has for its object to provide an improved oxygen supply system which incorporates the known desirable provision for the production of a mixture of air and oxygen for consumption upon the aircraft, with control of the proportioning of the ratio of oxygen to air in accordance with ambient pressure, which ratio may range from 0% oxygen to 100% air at low altitudes, where oxygen would not be required for breathing purposes, to 100% oxygen to 0% air at high altitudes, where pure oxygen would be required for breathing purposes.

The system to which the present invention relates incorporates a mixing unit for effecting the proportioning of oxygen and air for delivery to a main supply line from which withdrawal is effected for such purposes as breathing, pressure suit inflation, cabin pressurisation and the like.

According to the present invention, a supply of oxygen under pressure and a supply of air under pressure to a common mixing chamber are controlled by respective metering valves which are actuated by means responsive to ambient pressure in such manner that the ratio of oxygen increases and the ratio of air decreases with falling ambient pressure, and vice-versa, and the pressure of the oxygen supply to said chamber is maintained in substantially constant relationship to the pressure of the air supply by providing control valve means in the oxygen supply line actuated by means responsive to the pressure differential between the pressure of the air supply and the pressure of the oxygen supply at a point upstream of said control valve means.

An embodiment of the invention will now be described with reference to the drawing accompanying the provisional specification which is a diagrammatic sectional elevation of an air/oxygen regulator and mixing unit incorporated in a supply system of the invention.

Referring to the drawing, the casing 10 of this "air mix unit" is fabricated in several sections to provide the several chambers and flow passages referred to in detail below.

Air supply from a source of pressurised air (not shown, e.g. an aircraft engine) say, at 70 p.s.i., is brought to an inlet 11 of the casing 10, from which it passes through consecutive flow passages 12, 13 and 14 to a mixing chamber 15. Note that there is a valve seat 16 at the entrance to the flow passage 13, and a metering valve 17 for co-action with said seat 16. Oxygen supply from a source of pressurised oxygen (not shown), e.g. at 150–300 p.s.i., is brought to an inlet 18 of the casing 10 from which it passes through consecutive flow passages 19, 20 and 21 to the mixing chamber 15. Note that there is a valve seat 22 at the entrance to the flow passage 20, and a metering valve 23 for co-action with the valve seat 22.

The incoming air supply through inlet 11 enters a diaphragm chamber 24 before the air reaches the flow passage 12, and one side of a pressure-responsive diaphragm 25 is presented to the chamber 24. The incoming oxygen supply through inlet 18 enters a second diaphragm chamber 26 before the oxygen reaches the flow passage 19, and the other side of the diaphragm 25 is presented to the chamber 26. The diaphragm 25 is coupled by a pivoted lever 27 with a control valve member 28, which, as can be seen from the drawing, is co-acting with a valve seat formed by the entrance to the flow passage 19. Increase in the pressure of the incoming oxygen increases the pressure differential across the diaphragm 25, and the latter is flexed (downwardly in the drawing) to cause the control valve 28 to move towards its closed position, thereby throttling the oxygen supply to the mixing chamber 15 and tending to maintain said supply at constant pressure. Since the diaphragm 25 is responsive to the pressure differential across it, and the respective chambers on opposite sides of the diaphrgam are subjected to the oxygen pressure and the compressed air pressure, it follows that there is a substantially constant ratio between the oxygen and air supply pressures to the mixing chamber 15.

The metering valves 17 and 23 are carried at opposite ends of a common slide rod 28, the medial portion of which is located in an aneroid chamber 29 open to atmosphere via a passage 30. The respective ends of the slide rod 28 are enveloped by flexible bellows seals, 31 and 32 respectively, the bellows seal 31 enclosing the valve 17 and its seating 16, and the other bellows seal 32 enclosing the valve 23 and its seating 22. The bellows seals 31 and 32 are both secured by one end to the wall of the aneroid chamber 29, and by the other end to the common slide rod 28, the flexibility of said seals 31 and 32 allowing the rod 28 to move in endwise directions.

The chamber 29 houses an evacuated aneroid capsule 33, which expands or contracts with varying ambient pressure, and said capsule is connected to the slide rod 28, for actuating the latter, by means of a bell crank lever 34 which pivots about a fixed axis 35. As the aneroid capsule 33 expands progressively with progressively falling ambient pressure, the bell crank lever 34 is pivoted by the capsule about its axis 35, i.e. in clockwise direction in the drawing, and the slide rod 28 is moved to the left to bring the valve 23 away from its seating 22. This allows an increased flow of oxygen to pass from the flow passage 19 to the flow passage 20, and thence to the mixing chamber 15. At the same time, the other valve 17 is moved nearer to its seating 16, thereby throttling the flow of air from the flow passage 12 to the flow passage 13, and thence to the mixing chamber 15. With progressively rising ambient pressure, the reverse takes place as the slide rod 28 is moved to the right, the oxygen valve 23 progressively closing and the air valve 17 progressively opening. Two extremes may exist, in one of which air only is admitted to the mixing chamber 15 at sea level altitudes, the oxygen valve 23 being closed, and in the other of which oxygen only is admitted to the mixing chamber 15 at high altitudes where 100% oxygen is required for breathing purposes. Between these two extremes there is proportioning of air to added oxygen determined by the aneroid capsule 33 actuating the valves 17 and 23.

The invention therefore provides a system in which a substantially constant pressure ratio is maintained in the oxygen and air supplies to the mixing chamber 15, and while there is aneroid control of the actual proportions of the flows of oxygen and air which enter the mixing chamber 15, variations in said proportions under given operating conditions tend to be minimised.

The output from the mixing chamber 15 passes via a non-return valve 36 to an outlet chamber 37, and the latter has an outlet port 38 connected to a supply main (not shown) which is drawn upon for consumption, and it will be appreciated that in the example described, this supply main is at high pressure, so that where it is drawn upon for inflating a pressure suit there can advantageously be direct supply from the main to the suit for rapid inflation, e.g. via an on-off valve.

For breathing purposes, withdrawals from the supply main would be by way of a demand regulator, which preferably incorporates an open/shut demand valve, advantageously having a snap action, with the object of minimising flow rate variations in the above described air mix unit due to the functioning of the demand regulator.

It will be appreciated that the embodiment herein described is by way of example only, and the design of the air-mix unit is capable of considerable variation while producing the same results. For example, each of the two valves 23 and 17 which control the inlet of oxygen and air respectively to the mixing chamber may have its own aneroid.

We claim:

1. In an oxygen supply system having a mixing unit for proportioning oxygen and air, the combination of a casing, a common mixing chamber within said casing, a first inlet for the supply of oxygen to said chamber and a second inlet for the supply of air to said chamber, a first metering valve for controlling said supply of oxygen, a second metering valve for controlling said supply of air, means responsive to ambient pressure operative to actuate said first and second metering valves to simultaneously increase the ratio of oxygen and decrease the ratio of air with falling ambient pressure, and to simultaneously decrease the ratio of oxygen and increase the ratio of air with rising ambient pressure, control valve means in said inlet for the supply of oxygen, and actuating means for said control valve means, said actuating means being responsive to the pressure differential between the pressure of said supply of air and the pressure of said supply of oxygen at a location upstream of said control valve means.

2. In an oxygen supply system having a mixing unit for proportioning oxygen and air, the combination of a casing, a common mixing chamber within said casing, a first inlet for the supply of oxygen to said chamber and a second inlet for the supply of air to said chamber, a first metering valve within said casing between said first inlet and said chamber for controlling said supply of oxygen, a second metering valve within said casing between said second inlet and said chamber for controlling said supply of air, an aneroid capsule subjected to ambient pressure, a bell crank lever connected to said aneroid capsule, a slide rod carrying at its respective ends said first and second metering valves and being connected to said bell crank lever, said aneroid capsule being operative to actuate said bell crank lever, said slide rod and said first and second metering valves, whereby the ratio of oxygen to air is simultaneously increased with falling ambient pressure and the ratio of oxygen to air is simultaneously decreased with rising ambient pressure, control valve means in said inlet for the supply of oxygen, and actuating means for said control valve means, said actuating means being responsive to the pressure differential between the pressure of said supply of air and the pressure of said supply of oxygen at a location upstream of said control valve means.

3. In an oxygen supply system having a mixing unit for proportioning oxygen and air, the combination of a casing, a common mixing chamber within said casing, an ambient pressure chamber within said casing, a first inlet for the supply of oxygen to said mixing chamber and a second inlet for the supply of air to said mixing chamber, a first metering valve for controlling said supply of oxygen, a second metering valve for controlling said supply of air, means within said casing responsive to ambient pressure operative to actuate said first and second metering valves to simultaneously increase the ratio of oxygen and decrease the ratio of air with falling ambient pressure, and to simultaneously decrease the ratio of oxygen and increase the ratio of air with rising ambient pressure, control valve means within said casing in said inlet for the supply of oxygen, and a diaphragm having one side subjected to the pressure of said supply of oxygen at a location upstream of said control valve means and the other side subjected to the pressure of said supply of air, said diaphragm being operative to actuate said control valve means.

4. In an oxygen supply system having a mixing unit for proportioning oxygen and air, the combination of a casing, a common mixing chamber and an ambient pressure chamber within said casing, a first inlet for the supply of oxygen to said mixing chamber and a second inlet for the supply of air to said mixing chamber, a first metering valve for controlling said supply of oxygen, a second metering valve for controlling said supply of air, an aneroid capsule within said ambient pressure chamber subjected to ambient pressure, a bell crank lever connected to said aneroid capsule, a slide rod carrying at its respective ends said first and second metering valves and being connected to said bell crank lever, said aneroid capsule being operative to actuate said bell crank lever, said slide rod and said first and second metering valves, whereby the ratio of oxygen to air is simultaneously increased with falling ambient pressure and the ratio of oxygen to air is simultaneously decreased with rising ambient pressure, control valve means in said inlet for the supply of oxygen, and a diaphragm having one side subjected to the pressure of said supply oxygen at a location upstream of said control valve means and the other side subjected to the pressure of said supply of air, said diaphragm being operative to actuate said control valve means.

5. In an oxygen supply system having a mixing unit for proportioning oxygen and air, the combination comprising a casing, means defining an ambient pressure chamber and a common mixing chamber within said casing, said casing including first and second inlets for conducting a supply of oxygen and air respectively to said mixing chamber, first and second metering valves disposed within said casing on a common actuator, said first metering valve controlling said supply of oxygen to said mixing chamber and said second metering valve controlling the supply of air to said mixing chamber, pressure responsive means within said ambient pressure chamber responsive to changes in ambient pressure operative to actuate said first and second metering valves to simultaneously increase the ratio of oxygen to air with a falling ambient pressure condition and to decrease the ratio of oxygen to air with a rising ambient pressure condition, control valve means in said casing between said first inlet and said first metering valve for controlling the supply of oxygen to said mixing chamber, and diaphragm means for actuating said control valve means in accordance with variations in a pressure condition, said diaphragm means responsive to the pressure differential between the pressure of said supply of air and the pressure of said supply of oxygen at a point upstream of said control valve means.

References Cited in the file of this patent

UNITED STATES PATENTS

| | | |
|---|---|---|
| 1,065,615 | Lawler | June 24, 1913 |
| 1,772,920 | Smoot | Aug. 12, 1930 |
| 2,009,102 | Bern | July 23, 1935 |
| 2,145,544 | Hapgood | Jan. 31, 1939 |
| 2,434,420 | Lichtenstein | Jan. 13, 1948 |